UNITED STATES PATENT OFFICE 2,515,700

3-AMINO-1,2 DIPHENYL-PROPANOL-1

John Joseph Denton, Bound Brook, and Virginia Ann Lawson, Bedminster, N. J., assignors to American Cyanamid Company, New York, N. Y., a corporation of Maine No Drawing. Application January 22, 1949, Serial No. 72,275

4 Claims. (Cl. 260—247)

The present invention is primarily concerned with a novel group of physiologically-active amino alcohols. More specifically, the invention is concerned with alcohols of the general type formula

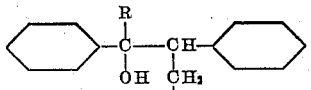

wherein "R" is hydrogen, an alkyl, an aryl radical, a 1–6 membered aliphatic radical, phenyl, or a hydroxy, alkoxy or halogen-substituted phenyl radical; and "Am" represents a tertiary amino radical. The invention contemplates not only the alcohols but also their addition and quaternary salts and the synthesis of such compounds.

Many different synthetic compounds, pharmacologically-active to varying degrees as antispasmodics and local anesthetics, have been synthesized from time to time. Apparently, the more active and useful of these compounds in general comprised complex molecules containing at least one ester linkage. The ester linkage was generally accepted as necessary by analogy to the naturally-occurring extractives which were considered esters of tropic or pseudo-tropic acids. Such groupings were thought essential in a compound which would be sufficiently active as well as sufficiently safe for general use.

Unfortunately, for one reason or another, many, if not most, of these compounds were not wholly satisfactory. Among other factors, the presence of the ester grouping introduces a chemically labile structure which adds to the instability of the molecule. This creates difficulty in the laboratory, making the preparation, purification, identification and handling of the materials difficult. Further, modification may occur in several ways in the animal organism in which the compound is attempted to be used. For example, the compound may break down into other compounds which are ineffectual, or irritating, or possibly even highly toxic.

It is, therefore, the principal object of the present invention to develop a series of synthetic compounds which are physiologically-active but not subject to the objectionable breakdown which so frequently characterized the more active of the previously-known, synthetic, pharmacologically-active esters.

In the accomplishment of these objects in accordance with the present invention, the surprising fact has been found that the ester linkage considered essential in the prior art is wholly unnecessary. It has been found, in accordance with the present invention, that the desirable characteristics are evidenced by a group of basic nitrogenous alcohols containing no semblance of an ester grouping.

In particular, the present application contemplates substituted basic 1,2-diphenyl propanols of the general formula noted above in which R and Am may be varied somewhat. The group represented by R may have the values shown above. Am represents the residue of a tertiary amine, the nitrogen being present in any of several slightly different but similar groupings. Am may represent the residue of a tertiary amine capable of illustration by the structure

in which $R_3$ and $R_4$ may be the same or different radicals selected from the alkyl radicals of about 1–4 carbon atoms. Am may also represent a group in which the amino nitrogen is a part of a reduced heterocyclic ring structure, the nitrogen being contained in the grouping

Such heterocyclic radicals include for example the piperidyl, morpholyl, piperazyl and N-substituted piperazyl groupings. From the foregoing it will be seen that the compounds prepared in accordance with the present invention may vary quite widely in scope and structure. Typical illustrative compounds within the specific limitations of this invention are shown in the following table in which compounds within the general formula above are indicated by the values of R and Am.

Table

| R | Am | R | Am |
|---|---|---|---|
| H | —N(CH₃)₂ | n—C₄H₉ | —N⟨H⟩ |
| CH₃ | —N(CH₃)₂ |  | —N⟨H⟩ |
| C₂H₅ | —N(CH₃)₂ |  |  |
| n—C₃H₇ | —N(CH₃)₂ |  |  |
| i—C₃H₇ | —N(CH₃)₂ | ⟨⟩—Cl |  |
| n—C₄H₉ | —N(CH₃)₂ |  |  |
| i—C₄H₉ | —N(CH₃)₂ | Cl⟨⟩— | —N⟨H⟩ |
| t—C₄H₉ | —N(CH₃)₂ |  |  |
| C₂H₅ | —N(C₂H₅)₂ | ⟨⟩— | —N⟨H⟩ |
| C₂H₅ | —N(C₃H₇)₂ | OH |  |
| C₂H₅ | —N(C₄H₉)₂ | CH₃O |  |
| ⟨⟩— | —N(C₂H₅)₂ | ⟨⟩— | —N⟨H⟩ |
| ⟨⟩— | —N⟨H⟩ | ⟨⟩— | —N⟨H O⟩ |
| H | —N⟨H⟩ | C₂H₅ | —N⟨H O⟩ |
| CH₃ | —N⟨H⟩ | H | —N⟨H O⟩ |
| C₂H₅ | —N⟨H⟩ | ⟨⟩— | —N⟨H O⟩ |

In general, the basic alcohols of the present invention comprise crystalline solids, usually having a sharp melting point although some are inclined to sinter slightly just below the melting point. Some of the compounds, however, are difficultly crystallizable and until well purified may appear to be parmanent oils. The crystalline compounds appear to be free from color when pure. Most of the alcohols are relatively insoluble in water but are readily soluble in ether and in alcohol-ether mixtures, pyridine and the like.

The alcohols readily form crystalline addition and quaternary salts. The hydrochloride, nitrate, citrate and the like are prepared by reacting the alcohol in solution with the desired acid in the ordinary way. Quaternary salts such as the methiodide, ethobromide and the like form readily in the normal way by treating the alcohol with the corresponding alkyl halide. Both types of salts are readily water-soluble. In some cases the water-solubility is so marked that the salts are extremely hygroscopic and in crystalline form must be carefully handled. They possess the markedly useful property in aqueous solution of remaining stable over long periods of time. The salts therefore possess marked utility for pharmacological experimentation.

It is surprising that the basic tertiary alcohols of this invention should possess anti-spasmodic properties in view of the previously considered desirability of the ester linkage. Especially is this a surprising feature in view of the fact that secondary alcohols of similar structure, for example, 3-(1-piperidyl)-1-phenyl-1-propanol and the like possess no appreciable pharmacological activity either as anesthetics or spasmolytics. In addition, a number of the compounds exhibit analgesic properties.

Both secondary and tertiary alcohols may be within the purview of this invention. Secondary alcohols, such as those previously noted, are prepared by catalytic hydrogenation of the corresponding ketone. The new basic tertiary alcohols of the present invention, being of entirely different type, cannot be prepared by the same type of synthesis.

According to the present invention, a synthesis for the tertiary amino alcohols has been developed which is both general and effective in operation. This process involves the addition of a suitable Grignard reagent to the proper basic ketone in the presence of a suitable solvent for both. Heating for sufficient time to complete the reaction, followed by hydrolysis produces the desired basic tertiary alcohol. A typical illustration of the reaction may be indicated as follows:

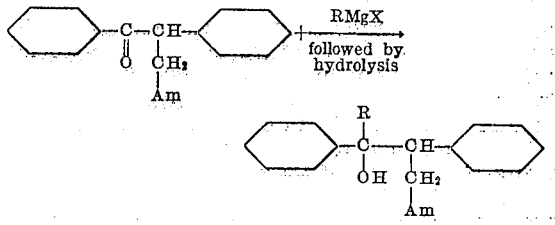

where R has the values noted above and X is a halogen. Since the first stage in this reaction must be carried out under conditions which are not conducive to hydrolysis, a dialkyl ether, for example diethyl or dibutyl ether and the like, has been found to be a wholly satisfactory solvent.

Several precautionary measures should be observed for best operation. Since the first step, the addition of the Grignard reagent, must be carried out under conditions which are not conducive to hydrolysis, the solvent, whether an ether, a benzene-pyridine mixture, or the like, should be essentially anhydrous.

Choice of the particular halogen used in the

Grignard reagent may have certain advantages in individual cases. In general, the chloride, bromide and iodide may all be used. In some cases, however, the reagent itself apparently tends to form an insoluble complex with the ketone. In such cases the chloride appears to produce the least insoluble complexes and therefore may be preferable. For a similar reason, in such cases the use of a higher boiling solvent such as dibutyl ether may become preferable in order to utilize increased temperature and thereby improve the solubility.

The amount of Grignard reagent chosen also has an effect on the yield. Apparently this again may be due to the formation of a complex. The latter is believed to form but to break down on hydrolysis. For this reason it appears that some of the reagent is not available for further reaction. In any case a considerable increase over an equimolecular amount of the Grignard reagent ordinarily produces a definitely increased yield. Above about two molecular equivalents, however, further increase in the amount used produces a markedly diminishing return. About two moles of Grignard reagent per mole of ketone appears to be the preferable range.

Preparation of the compounds of the present invention will be illustrated in conjunction with the following typical examples. These examples are to be taken as illustrative only of the procedural methods and not by way of limitation. All parts are by weight unless otherwise noted.

EXAMPLE 1

*3-(1-piperidyl)-1,2-diphenyl-1-propanol hydrochloride*

To an autoclave is charged 24.5 parts beta-(1-piperidyl) - alpha - phenylpropiophenone hydrochloride (Mannich and Lammering, Ber., 55, 3510 (1922), 100 parts by volume ethanol, and 0.5 part palladium on charcoal catalyst. Under hydrogen pressure, the autoclave is heated at 93–94° C. until hydrogen usage ceases. It is cooled and vented, and the contents treated with hot alcohol until all organic material dissolves. The catalyst is removed by filtration, and the alcoholic filtrate is concentrated to about 500 parts by volume. On cooling, 3-(1-piperidyl)-1,2-diphenyl-1-propanol hydrochloride crystallizes. It may be further purified by recrystallization from alcohol. When pure, it melts at 263–265.5° C. (unc.). The free base, liberated in the usual way from this hydrochloride, melts at 92.3–93.4° C.

EXAMPLE 2

*1-(1-piperidyl)-2,3-diphenyl-3-pentanol hydrochloride*

To a cooled solution of ethylmagnesium bromide (prepared from 15 parts magnesium turnings, 65.8 parts ethyl bromide, and 350 parts by volume dibutyl ether) is added dropwise over a 30 minute period a solution of 77 parts beta-(1-piperidyl)-alpha-phenylpropiophenone in 500 parts by volume dibutyl ether. The reaction mixture is heated at 50–60° C. for one hour and then allowed to stand at room temperature until the reaction appears to be complete. With cooling and vigorous stirring the Grignard addition complex is decomposed by the dropwise addition of 150 parts by volume of 5 N hydrochloric acid. The resulting precipitate is collected on a filter and dried. The crude hydrohalide salt is then dissolved in dilute ethanol and neutralized with ammonium hydroxide. The crystalline 1-(1-piperidyl)-2,3-diphenyl-3-pentanol which separates is collected on a filter. When purified by recrystallization from dilute methanol, it melts at 133.8–135.2° C. It may be converted to its hydrochloride in the usual way.

EXAMPLE 3

*1-(1-piperidyl)-2,3-diphenyl-3-heptanol hydrochloride*

By following the procedure described in Example 2 but substituting an equivalent amount of n-butylmagnesium bromide for the ethylmagnesium bromide, 1-(1-piperidyl)-2,3-diphenyl-3-heptanol hydrochloride may be obtained. When pure, it melts at 208.5–210° C.

EXAMPLE 4

*1-(1-piperidyl)-6-methyl-2,3-diphenyl-3-heptanol hydrochloride*

By following Example 2, but allowing an equivalent amount of isoamylmagnesium chloride instead of ethylmagnesium bromide to react with beta-(1-piperidyl)-alpha-phenylpropiophenone, crude 1-(1-piperidyl)-6-methyl-2,3-diphenyl-3-heptanol hydrochloride is obtained. The product is purified by liberating the base from an aqueous solution of the salt, extracting with ether, acidifying the dried ether solution with hydrogen chloride and recrystallizing the precipitate from an alcohol-ether mixture. When pure, it melts at 222–226.5° C.

EXAMPLE 5

*3-(1-piperidyl)-1,1,2-triphenyl-1-propanol hydrochloride*

By following the procedure described in Example 2, but substituting an equivalent amount of phenylmagnesium bromide for ethylmagnesium bromide, crude 3-(1-piperidyl)-1,1,2-triphenyl-1-propanol hydrohalide may be obtained. This material is dissolved in a minimum of pyridine, filtered and the filtrate diluted with water in order to precipitate a solid base. Pure 3-(1-piperidyl)-1,1,2-triphenyl-1-propanol melts at 172.5–174° C., while the hydrochloride salt when prepared in the usual manner melts at 204.0–205.5° C.

EXAMPLE 6

*1-dimethylamino-2,3-diphenyl-3-pentanol hydrochloride*

This compound is prepared by the method described in Example 2, but by reacting the ethylmagnesium bromide with an equivalent amount of beta-dimethylamino-alpha-phenylpropiophenone instead of beta-(1-piperidyl)-alpha-phenylpropiophenone. Pure 1-dimethylamino-2,3-diphenyl-3-pentanol when dissolved in ether and acidified with hydrogen chloride yields a hydrochloride melting at 230–232° C. When liberated in the usual way from its hydrochloride and further purified by recrystallization from alcohol, the corresponding free base melts at 105.5–106.5° C.

The beta-dimethylamino-alpha-phenylpropiophenone may be conveniently prepared as follows:

To a stirred solution of 395 parts of 25% aqueous dimethylamine in 600 parts by volume of ethanol is added dropwise with external cooling 193 parts of formalin. The resulting solution is allowed to warm to room temperature and there is then added 440 parts desoxybenzoin. After being stirred at room temperature for one hour, it is heated under reflux for two hours, cooled, and diluted with 500 parts of water. The crystalline beta-dimethylamino-alpha-phenylpropiophenone precipitates. When converted to its hydrochloride and this is further purified by recrystallization from an alcohol-ether mixture, the hydrochloride melts at 156–157.6° C. with decomposition when inserted at 150° C. in a bath being heated at the rate of one degree per minute.

EXAMPLE 7

*1-(4-morpholyl)-2,3-diphenyl-3-pentanol hydrochloride*

By following Example 2 and treating an equivalent amount of beta-(4-morpholyl)-alpha-phenylpropiophenone instead of beta-(1-piperidyl)-alpha-phenylpropiophenone with ethylmagnesium bromide, a crude product is obtained, which when purified as in Example 2, gives 1-(4-morpholyl)-2,3-diphenyl-3-pentanol hydrochloride melting at 231.8–232.5° C.

By following the procedure in Example 6 for the preparation of beta-dimethylamino-alpha-phenylpropiophenone, except that an equivalent amount of morpholine in terms of actual dimethylamine is used instead of the aqueous dimethylamine, beta-(4-morpholyl)-alpha-phenylpropiophenone may readily be obtained. Its pure hydrochloride melts at 166–167° C. when inserted at 160° C. in a bath being heated at the rate of one degree per minute.

We claim:

1. A compound selected from the group consisting of the basic 1,2-diphenyl-propanols of the general formula

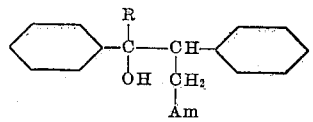

their acid addition and quaternary salts, in which R is selected from the group consisting of hydrogen, the alkyl radicals of 1–6 carbon atoms, phenyl and hydroxy, methoxy and halogen substituted phenyl radicals, and Am represents a tertiary amino group contained in a member selected from the group consisting of the dialkyl amino radicals, in which the alkyl radicals contain 1–4 carbon atoms, and the piperidino and morpholido radicals.

2. A compound according to claim 1 in which R is $C_2H_5$— and Am is

3. A compound according to claim 1 in which R is $n-C_4H_9$— and Am is

4. A compound according to claim 1 in which R is

and Am is

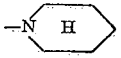

JOHN JOSEPH DENTON.
VIRGINIA ANN LAWSON.

REFERENCES CITED

The following references are of record in the file of this patent:

UNITED STATES PATENTS

| Number | Name | Date |
|---|---|---|
| 1,978,539 | Klarer et al. | Oct. 30, 1935 |
| 2,160,138 | Gaylor | May 30, 1939 |
| 2,442,865 | Smith | June 8, 1948 |

FOREIGN PATENTS

| Number | Country | Date |
|---|---|---|
| 361,471 | France | May 13, 1905 |
| 11,197 | Great Britain | of 1906 |

OTHER REFERENCES

Campbell et al., Jour. Org. Chem., vol. 9 (1944), p. 179. (Complete article 178–183.)